Patented Oct. 25, 1938

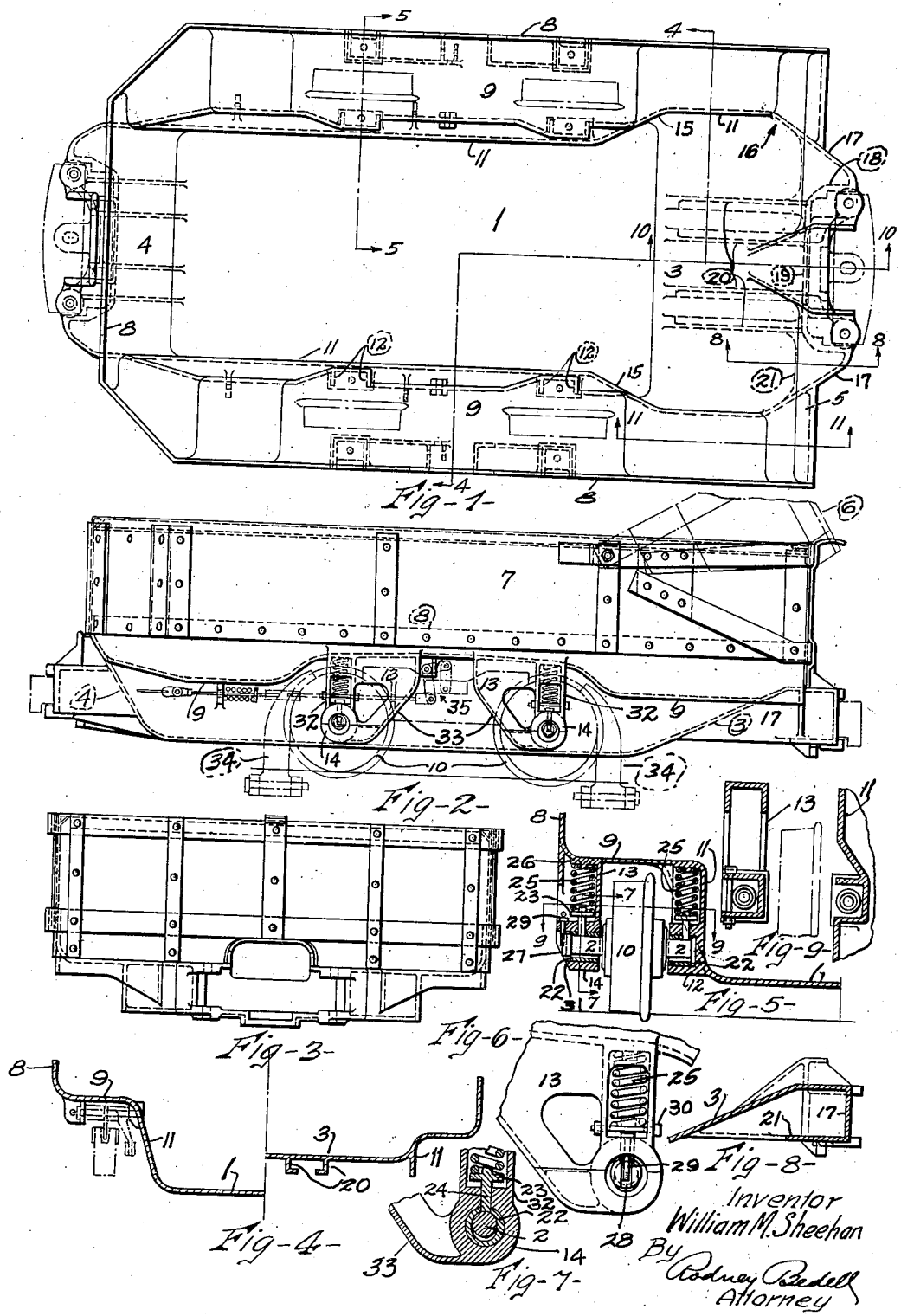

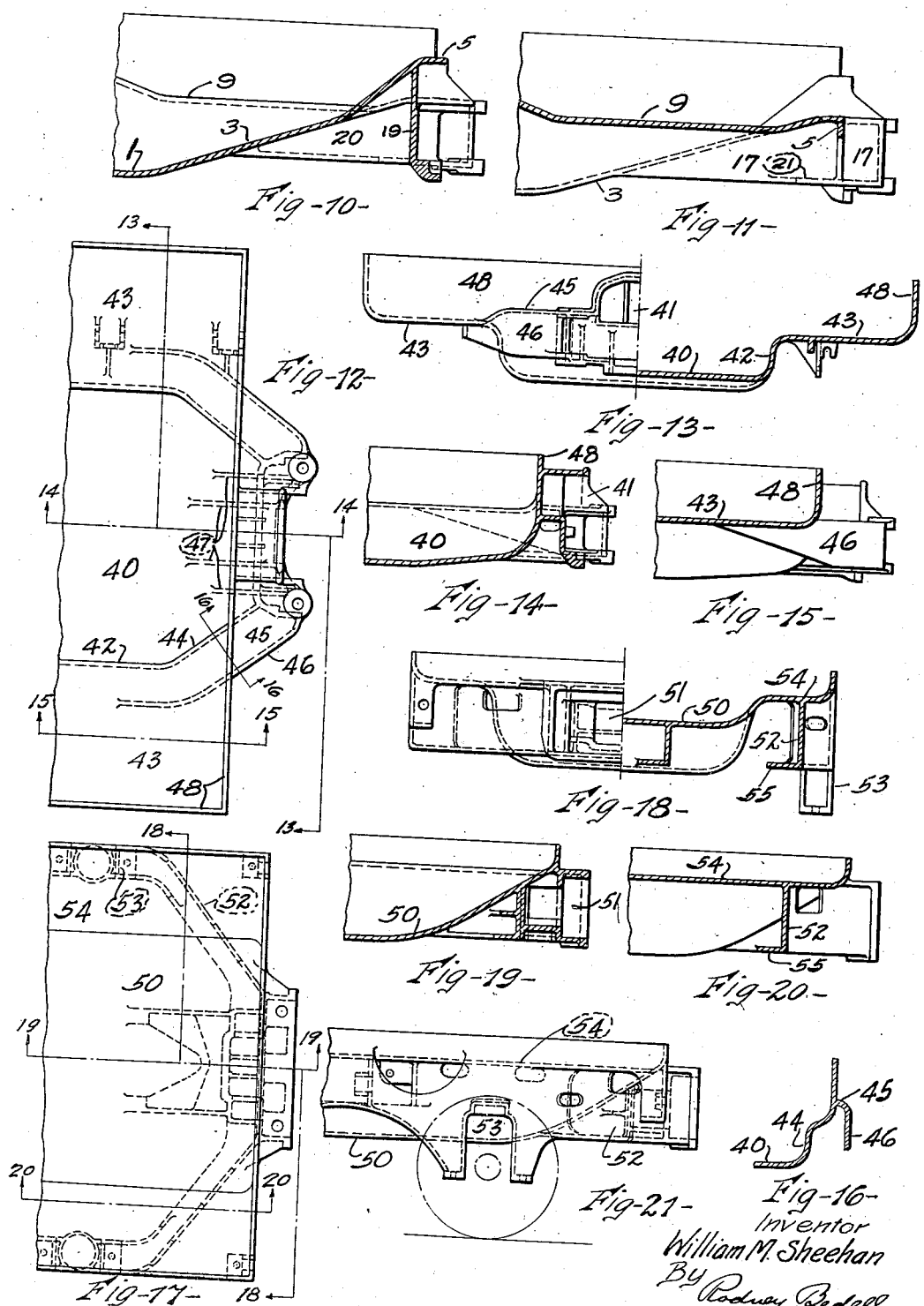

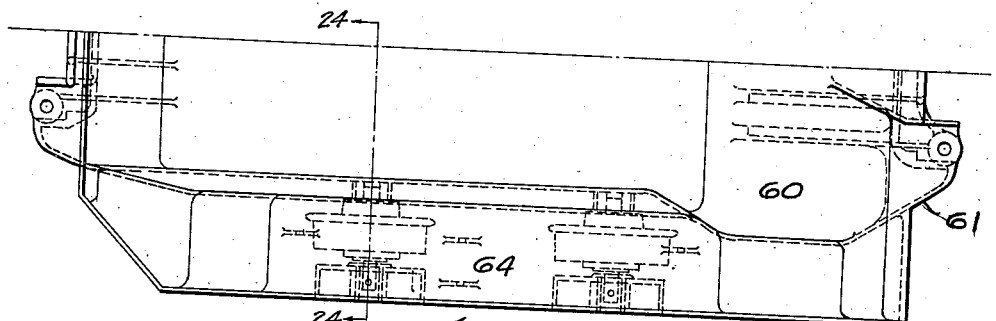
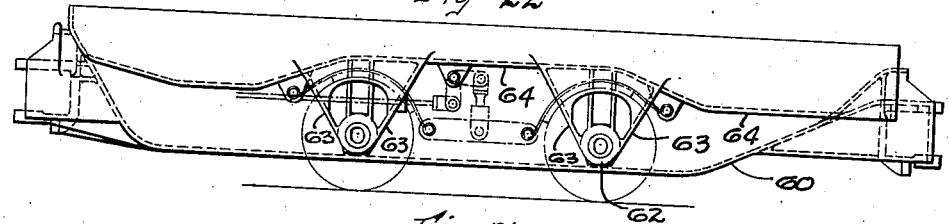
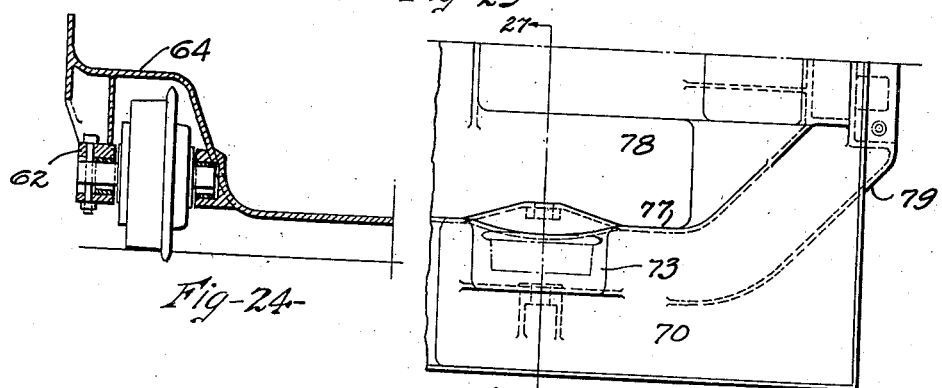
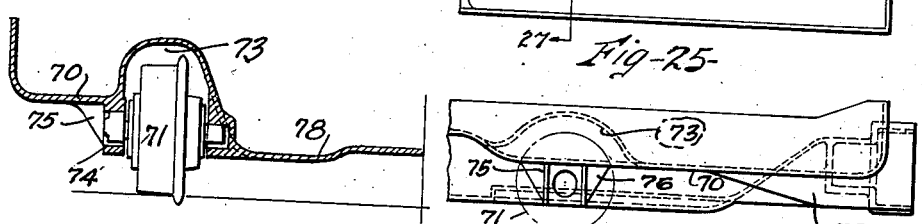

2,134,211

UNITED STATES PATENT OFFICE 2,134,211

CAR STRUCTURE

William M. Sheehan, Merion, Pa., assignor to General Steel Castings Corporation, Granite City, Ill., a corporation of Delaware Application April 11, 1934, Serial No. 720,005

10 Claims. (Cl. 105—364)

The invention relates to a rail vehicle for use in mine, quarry, or similar types of service requiring transportation of bulk material in relatively small quantities over uneven tracks and under conditions where compactness and rigidity of structure are highly desirable.

The invention consists in a car body floor-forming web and parts associated therewith, the web having general characteristics illustrated and claimed, in part, in my co-pending applications Serial Nos. 594,687, filed February 23, 1932; 616,673, filed June 11, 1932; 619,226, filed June 25, 1932; 622,927, filed July 16, 1932, and 635,904, filed October 3, 1932.

One of the objects of the present invention is to facilitate dumping the car load through one end of the car.

Another object is to facilitate the transmission and absorption of buffing and draft forces from the draft gear, located at the longitudinal center line of the car, by means of the car flooring and without substantial additional beams and other structural members tending to increase the car weight and decrease its capacity.

Another object of the invention is to mount the car wheels simply and in a manner to accommodate inequalities in the track without unduly stressing the car floor-framing.

Another object is to facilitate the locking of the car to a dumping machine by means of wheel gripping latches.

Other objects are to minimize the car weight without decreasing its capacity or strength as required for useful service under the conditions mentioned and at the same time to provide long life at low maintenance expense.

Other objects of the invention will be apparent from the detail description of the structure and its functions and from inspection of the invention as illustrated in the accompanying drawings in which—

Figure 1 is a top view of one form of a car body-forming floor web and associated structure.

Figure 2 is a side elevation of the same and includes superstructure not shown in Figure 1.

Figure 3 is an end elevation of the car shown in Figure 2.

Figures 4 and 5 are vertical transverse sections taken on the corresponding section lines of Figure 1.

Figure 6 is an enlarged detail side elevation of one of the wheel axle mounting pedestals.

Figure 7 is a detail longitudinal section taken on the line 7—7 of Figure 5.

Figure 8 is a longitudinal detail section taken on the line 8—8 of Figure 1.

Figure 9 is a detail horizontal section taken on the line 9—9 of Figure 5.

Figures 10 and 11 are detail longitudinal vertical sections taken on the corresponding section lines of Figure 1.

Figure 12 is a top view of one end of a car body floor-forming web and associated structure illustrating another form of the invention.

Figure 13 is, in part, an end view and, in part, a vertical transverse section and is taken on the line 13—13 of Figure 12.

Figures 14, 15 and 16 are vertical longitudinal and diagonal sections taken on the corresponding section lines of Figure 12.

Figure 17 corresponds to Figure 12 but illustrates another form of the invention.

Figure 18 is an end view and a vertical transverse section taken on the line 18—18 of Figure 17.

Figures 19 and 20 are vertical longitudinal sections taken on the corresponding section lines of Figure 17.

Figure 21 is a side elevation of the structure shown in Figure 17.

Figure 22 is a top view of one longitudinal half of a body floor-forming web and associated structure embodying another form of the invention.

Figure 23 is a side elevation of the same.

Figure 24 is a vertical transverse section taken on the line 24—24 of Figure 22.

Figure 25 is a top view of one-half of one end of a body floor-forming web plate embodying another form of the invention.

Figure 26 is a side elevation of the same.

Figure 27 is a vertical transverse section taken on the line 27—27 of Figure 25.

Each form of the invention preferably comprises a single casting forming a seamless web plate from end to end and from side to side of the vehicle and shaped to provide reinforcing sill-like elements and including as integral parts thereof wheel mounting pedestal structure, draft gear pockets, brake mountings, and other members as will be referred to later.

In Figures 1 to 11, inclusive, the web plate includes a central floor member 1 extending throughout the major portion of the length of the car at a level below the axles 2. This central floor member is inclined upwardly at each end, as indicated at 3 and 4. The inclined portion 3 is relatively long and gentle in order to facilitate the dumping of the load through the adjacent end of the car and over the end sill 5 and draft pocket structure when the car is tilted bodily. This end of the car is provided with a movable door 6 mounted on the car side walls 7 which are carried by the upturned flange 8 extending along the two sides and the other end of the web plate.

At the sides of member 1 are angular sill-like structures comprising upright elements 11 and horizontal elements 9, portions of which are elevated to extend over the wheels 10. The upright element 11 extends upwardly from the central floor 1 throughout most of the length of the latter, extends both upwardly and downwardly from the inner part of the inclined portion 3 of the central floor, and extends downwardly from the outer part of the inclined portion 3 and the end sill 5.

Cylindrical bosses 12 project outwardly from sill elements 11 to receive the inner ends of axles 2. Pedestals 13 depend from the outer portions of the side floors or sill elements 9 and terminate in cylindrical sleeves 14 for receiving the outer ends of axles 2. Sill elements 11 are offset outwardly beyond the bosses 12, adjacent the dumping end of the car, as indicated at 15, to form diverging side wall structures avoiding crowding of the load when the car is dumped notwithstanding the upward inclination of the floor at 3 and thereby facilitating the passage of the load lengthwise of the car.

Where the side floors 9 and the tops of sills 11 merge with the inclined floor 3, as at 16, the sills converge towards each other, as indicated at 17, and merge with the side walls 18 of the draft pocket structure which includes a rear wall 19. A plurality of vertical ribs 20 extend rearwardly from wall 19 and merge with the inclined floor 3, and horizontal webs 21 connect the lower portions of the converging sills 17 with the outer ribs 20. This floor sill and rib structure is adequate for receiving draft and buffing forces and transmitting them throughout the wide web structure and eliminates heavy reinforcing members which, if present, would cut down the capacity of the car and increase the weight thereof.

Bosses 12 and sleeves 14 are provided with renewable bushings 22 and preferably each bushing inner surface is elongated vertically (Figure 7) providing for vertical play of the axle 2 therein. A spring seat 23 is located above each boss and sleeve and includes a depending pin 24 which projects through openings therefor in the boss or sleeve and the corresponding bushing and rests upon the axle 2.

Springs 25 are compressed between movable seats 23 and fixed seats 26 therefor on the bottom of side floor 9. This arrangement enables the wheels to drop into depressions in the track without unduly straining the floor framing structure. The axles are stationary in their mountings, the wheels being rotatably mounted upon the axles in any customary manner, preferably by means of an anti-friction device.

The outer end of each axle is enlarged at 27 and a groove 28 in this enlargement receives a pin 29 extending through the upper wall of the sleeve 14. Pin 29 is held against removal by a horizontal bolt 30. Preferably the lower outer portion of sleeve 14 is beveled diagonally inwardly and downwardly at 31 to provide increased clearance for objects along the track adjacent this part of the car structure.

Preferably each of the pedestals 13 has its edge 32 facing the adjacent end of the car disposed vertically and spaced a relatively short distance from the vertical plane of the shaft axis. The opposite portion 33 of the pedestal extends horizontally and diagonally from the axle receiving sleeve up to the side floor 9, thus bracing the axle bearing longitudinally of the car.

This arrangement accommodates the application and removal of latches 34 by which the car is locked to the dumping machine whereby the car is tilted to discharge its load.

The side floor 9 is recessed upwardly over wheels 10 to accommodate the latter and to mount brake rigging 35 between the wheels. Beyond the wheels, side floor 9 extends at a lower level, thereby increasing the capacity of the car. The upstanding flange 8 at the edge of the side floor extends downwardly adjacent the wheels to form a portion of the pedestal structure which also forms a housing for the outer spring 25.

Figures 12 to 16 illustrate a modified structure particularly adapted for cars which are dumped by rotating the same about a longitudinally extending axis instead of dumping the load through an end of the car. With such a car it is unnecessary to have the long sloping end floor portion described above. The comparatively horizontal end floor portion 40 is located at a lower level than the draft gear pocket 41 which is wholly beyond the end wall of the car. This provides increased capacity but is not so well adapted to resist buffing forces due to the offsetting of the center line of draft and the floor web forming the framing which must resist or absorb the draft forces. Accordingly, the upright webs 42 between the center floor 40 and the side floors 43 while having diagonal terminals 44 merging with the draft gear pocket 41, are reinforced by additional elements 45 and 46 whereby diagonal sills of inverted U-section extend from the sides of the draft gear pocket outwardly and rearwardly to the web plate. Relatively short vertical ribs 47 cooperate with the diagonal sills to distribute the draft forces. In this construction the upright flange 48 for mounting the superstructure extends entirely around the car floor and forms a part of the end sill.

Figures 17 to 21 illustrate another form of the invention in which the end portion of the center floor 50 is inclined more abruptly than shown in the structure of Figures 1 to 12, but less so than in the structure of Figures 12 to 16. This is due to the location of the draft pocket 51 which extends inwardly of the end wall and is at a relatively lower level than in the form previously described, and the diagonal sills 52, merging at their forward ends with the draft gear pocket, extend outwardly to the sides of the car and merge at their rear ends with the axle box pedestals 53 directly beneath the outer edge of the upper floor 54. Sills 52 have flanges 55 and these flanges and side floors 54 contribute to a channel-shaped sill structure for transmitting the draft and buffing forces, a greater proportion of which are carried through the diagonal members and the side portions of the underframe than in the structures described previously.

The car shown in Figures 22 to 24 utilizes an end floor 60 and diagonal sill structure 61 similar to that illustrated in the form of Figures 1 to 12, but the axle mounting pedestals are distinctive in that they are substantially of V formation with the apex of each V forming the axle-receiving sleeve 62 and the upwardly diverging front and rear edges 63 of the pedestal merging with the side floors 64 to brace the axle-mounting sleeves longitudinally of the car. This arrangement is intended for use where the dumping machine brackets illustrated in Figure 2 are not to be applied.

The modification illustrated in Figures 25 to 27 involves a car in which the side floors 70 project a substantially greater distance beyond the wheels 71 than in the forms previously described. This makes it possible to obtain increased capacity by locating the side floors 70 at a lower level than in the previous forms, there being relatively restricted upward recesses 73 in the side floors for receiving the upper portions of the wheels. The outer axle bearing mountings 74 are little more than bosses on the lower face of the side floor although reinforcing ribs 75 and 76 may be used to advantage. Due to the width of the car and the relatively shallow depth of the vertical web 77 between the center floor 78 and the side floors 72, it is desirable to provide diagonal sill elements in addition to the diagonal offset between the floor portions and this requirement is met by the provision of a vertical web 79 resembling the web 46 in the form shown in Figures 12 to 16.

The axle mounting shown in Figure 27 omits the renewable bushing previously described, and this modification may be applied to each of the other forms of the invention. It will be understood that various features shown on only one of the modifications may be substituted in, or added to, the other structures illustrated and that other modifications in the details of construction may be made without departing from the spirit of the invention and exclusive use of such variations in structure coming within the scope of the appended claims is contemplated.

I claim:

1. In a car of the class described, a center floor inclined upwardly near one end of the car and longitudinal sill elements at the sides of said floor offset outwardly near said end and projecting downwardly from the inclined portion of said floor near said end, the floor and sill arrangement mentioned facilitating the discharge of the load through the end wall of the car, and sill elements converging towards each other from the end of said offset elements to better receive and distribute draft and buffing forces applied to the car near the longitudinal center line thereof.

2. In a car of the class described, wheels and axles, a floor-forming seamless web located below the level of said axles between said wheels but inclined upwardly near one end of the car, sill-forming elements having portions extending upwardly from the lower level part of said web and having portions extending downwardly from the inclined part of said web, the upwardly extending portions of said elements diverging near said car end to facilitate dumping the car load through the end wall, and the downwardly extending portions of said elements converging nearer to said car end to better transmit buffing and draft forces applied to the car near the longitudinal center line thereof.

3. In a car of the class described, a floor web structure including upright parts forming longitudinal sill elements provided with inside axle bearings, said sill elements at one end of the car being offset diagonally outwardly of the car center line beyond the vertical planes of said bearings and then converging diagonally towards each other and terminating in a centrally located draft gear pocket.

4. In a car of the class described, a draft pocket, a web plate forming a low level center floor and relatively high level side floors and upright sill-like elements between said floors, said elements near the end of the car converging towards each other to merge with said draft pocket, and vertical members paralleling the converging portions of said elements and spaced outwardly therefrom and connected therewith to form relatively heavier diagonal sill structure for distributing draft and buffing forces.

5. In a car of the class described, a web plate forming a low level central floor portion and relatively elevated side floor portions, an upright element between them, said side floor portions extending from end to end of the car, and an end sill, a draft pocket structure extending outwardly from said end sill, and members of inverted U-shaped section extending diagonally from said draft pocket structure outwardly and rearwardly, parts of said members merging with the elevated side floor portions of said web plate and one of the legs of each of said members constituting an extension of said upright element longitudinally of the car beyond said web plate.

6. In a car of the class described, traction wheels, a floor-forming web plate offset adjacent said wheels to provide an elevated portion overlying said wheels, pedestals depending from said elevated portion outwardly of said wheels to mount the axles of said wheels, draft pocket structure at the longitudinal center of the end of said web, and diagonal members extending directly from the rear corners of said draft pocket structure to said pedestals.

7. Structure as specified in claim 6 in which the end portion of the floor-forming web is inclined upwardly to extend over the diagonal members and to merge with the upper part of the draft pocket structure, and reinforcing rib-like elements bracing said web end portion and the inner wall of said draft pocket structure.

8. In a car of the class described, a central floor portion, a side floor portion in a plane above that of said central floor portion and including wheel hood structure, and pedestals formed within and depending from said structure and each including a portion for receiving a wheel axle and each provided with a spring pocket located on the vertical center line of said portion.

9. In a railway car, a car bottom comprising a unitary casting including a central floor portion, side floor portions extending horizontally above the level of the center floor portion and including wheel hood structure, and pedestals formed within and depending from said hood structure and each provided with an axle receiving opening and with a spring pocket arranged substantially on the vertical center line of said opening.

10. In a railway car, a car bottom comprising a unitary casting including a central floor portion, side floor portions in a horizontal plane above that of the central floor portion and having wheel hoods formed therein, and pedestals formed within and depending from the wheel hoods and each provided with a substantially centrally arranged spring pocket.

WILLIAM M. SHEEHAN.